(12) United States Patent
Sonneveldt et al.

(10) Patent No.: US 11,317,124 B2
(45) Date of Patent: Apr. 26, 2022

(54) APPARATUS AND METHOD FOR GENERATING AN IMAGE DATA STREAM

(71) Applicant: KONINKLIJKE PHILIPS N.V., Eindhoven (NL)

(72) Inventors: Bartolomeus Wilhelmus Damianus Sonneveldt, Eindhoven (NL); Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/279,252

(22) PCT Filed: Sep. 16, 2019

(86) PCT No.: PCT/EP2019/074606
§ 371 (c)(1),
(2) Date: Mar. 24, 2021

(87) PCT Pub. No.: WO2020/064376
PCT Pub. Date: Apr. 2, 2020

(65) Prior Publication Data
US 2022/0053222 A1 Feb. 17, 2022

(30) Foreign Application Priority Data
Sep. 25, 2018 (EP) .................................... 18196433

(51) Int. Cl.
*H04N 21/218* (2011.01)
*H04N 21/434* (2011.01)
*H04N 21/4728* (2011.01)

(52) U.S. Cl.
CPC ..... *H04N 21/21805* (2013.01); *H04N 21/434* (2013.01); *H04N 21/4728* (2013.01)

(58) Field of Classification Search
CPC ............. H04N 21/4728; H04N 21/434; H04N 21/44008; H04N 21/44012; H04N 21/816
See application file for complete search history.

(56) References Cited

U.S. PATENT DOCUMENTS 9,900,620 B2  2/2018 Lee et al.
2009/0201992 A1  8/2009 Seo

OTHER PUBLICATIONS

Lim et al "A Multiview Sequence Codec With View Scalability" Signal Processing Image Communicat, vol. 19, No. 3, Mar. 1, 2004 p. 239-256.
International Search Report and Written Opinion From PCT/EP2019/074606 dated Apr. 2, 2020.

*Primary Examiner* — Alazar Tilahun

(57) ABSTRACT

An apparatus comprises a processor (301) providing a plurality of reference video streams for a plurality of reference viewpoints for a scene. A receiver (305) receives a viewpoint request from a remote client where the viewpoint request is indicative of a requested viewpoint. A generator (303) generates an output video stream comprising a first video stream with frames from a first reference video stream and a second video stream with frames from a second reference video stream. The frames of the second video stream are differentially encoded relative to the frames of the first video stream. A controller (307) selects the reference video stream for the first and second video streams in response to the viewpoint request and may be arranged to swap the reference video streams between being non-differentially encoded and being differentially encoded when the viewpoint request meets a criterion.

20 Claims, 6 Drawing Sheets

APPARATUS AND METHOD FOR GENERATING AN IMAGE DATA STREAM

CROSS-REFERENCE TO PRIOR APPLICATIONS

This application is the U.S. National Phase application under 35 U.S.C. § 371 of International Application No. PCT/EP2019/074606, filed on Sep. 16, 2019, which claims the benefit of EP Patent Application No. EP 18196433.9, filed on Sep. 25, 2018. These applications are hereby incorporated by reference herein.

FIELD OF THE INVENTION

The invention relates to generating and rendering a video stream and in particular, but not exclusively, to generating and rendering a video stream for a virtual reality application.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in that they are based on a predetermined model of the scene, and typically on an artificial model of a virtual world. It would be desirable if a virtual reality experience could be provided based on real world capture. However, in many cases such an approach is very restricted or tends to require that a virtual model of the real world is built from the real world captures. The virtual reality experience is then generated by evaluating this model.

However, the current approaches tend to be suboptimal and tend to often have a high computational or communication resource requirement and/or provide a suboptimal user experience with e.g. reduced quality or restricted freedom.

As an example of an application, virtual reality glasses have entered the market. These glasses allow viewers to experience captured 360 degree (panoramic) or 180 degree video. These 360 degree videos are often pre-captured using camera rigs where individual images are stitched together into a single spherical mapping. Common stereo formats for 180 or 360 video are top/bottom and left/right. Similar to non-panoramic stereo video, the left-eye and right-eye pictures are compressed as part of a single H.264 video stream. After decoding a single frame, the viewer rotates his/her head to view the world around him/her. An example, is a recording wherein viewers can experience a 360 degree look-around effect, and can discretely switch between video streams recorded from different positions. When switching, another video stream is loaded, which interrupts the experience.

One drawback of the stereo panoramic video approach is that the viewer cannot change position in the virtual world. Encoding and transmission of a panoramic depth map besides the panoramic stereo video could allow for compensation of small translational motions of the viewer at the client side but such compensations would inherently be limited to small variations and movements and would not be able to provide an immersive and free virtual reality experience.

A related technology is free-viewpoint video in which multiple view-points with depth maps are encoded and transmitted in a single video stream. However, such an approach requires a high bit rate and may be restrictive in terms of the images that can be generated.

An example of a capture and playback system for free viewpoint visualization is illustrated in FIG. 1. On the capture side (server side SRV), a scene 101 is captured by a one or two dimensional camera array 103. Each camera has a different reference/anchor location and observes the scene from a slightly different perspective. On a remote playback side (client side CLNT), a viewer 104 looks at the captured content on a 3D display 107 or using virtual reality glasses. The viewers' eye locations, and therefore his viewing perspective, is measured using for example an eye-tracker 109. The corresponding camera signal is selected and retrieved from a server 105 that streams the content over a network 111. The content can be sent live or from on the servers' filesystem. At the client side (CLNT), a receiver 113 comprises a decoder which can decode the received content/image/video stream to generate a decoded stream. A display controller 115 then generates the appropriate view images and renders them on the display 107. In the system, depending on a viewers' detected perspective/pose, a subset of camera streams is selected and used to generate the rendered images.

An approach where the presented view changes dynamically corresponding to head motion is referred to as 'motion parallax'. Preferably, motion parallax is consistent with 3D stereopsis where each eye receives a different perspective view of the scene. When the camera view data is accompanied by depth (or disparity estimated) information, the viewpoints in between the actual camera viewpoints can be synthesized. This is used for a smooth playback. It also enables limited extrapolation beyond captured viewpoints. In the system of FIG. 1, data is transferred from a server 105 over a network 111 to one or more clients. To do this efficiently, (multi-view) video coding of images and depth maps can be used.

The described application is an interactive system. A camera stream is selected in response to the viewers' head motion. Any latency on the interactive part causes the perceived views to lag behind and degrade the visual experience. By using depth based view-synthesis one can compensate for small latencies.

Two main latency components that influence interactivity (view switching) can be considered:
1. Network transmission latency. The 'selection' signal is sent upstream to the server and the correct camera views are transmitted downstream to the viewing site. The round trip delay of the channel or network then determines a first part of the latency.
2. Decoding latency. Efficient video codecs encode a set of multiple time-sequential video frames differentially together in a 'Group Of Pictures' (GOP). Some frames then need reference to earlier transmitted frames. Large GOPs have coding efficiency (bandwidth) benefits. However, large GOPs also increase decoding latency. It prevents instantaneous switching between encoded streams.

Differential encoding is well known for video encoding and is applied in many different ways with both temporal and spatial differential encoding being possible. For example, rather than encode an entire image independently (intra-frame), only the differences with respect to frames from other time-instances are encoded. For example, the High Efficiency Video Coding (HEVC) standard and its predecessors use this extensively. Frames from other camera viewpoints can be differentially encoded as well. This is for example described in MV-HEVC which is the multi-view extention of HEVC.

Network transmission latency is most often a given parameter that cannot easily be modified by the application. It may vary over time depending on e.g. the network load. Decoding latency on the other hand is a design consideration. Choosing a small GOP size reduces the latency but at the same time reduces coding efficiency.

It is desirable to reduce the latency as much as possible in order to provide an improved user experience, and especially in order to provide a more dynamically adaptive experience. The straightforward approach for solving this latency problem would be to encode and transmit all camera views together or as separate streams. At the viewing site it can then be instantaneously decided which view to use. However, such an approach would result in a very high data rate and require a high bandwidth of the network which would be highly undesirable in many applications. Indeed, whereas this approach may possibly in some scenarios be feasible for a low number of cameras it does not scale well to a higher number of streams/cameras, and is impractical in many applications. Furthermore because of the decoder latency, all views should continuously be decoded and this requires a high computational resource at the client.

Hence, an improved approach would be advantageous. In particular, an approach that allows improved operation, increased flexibility, reduced data rates, facilitated distribution, reduced complexity, facilitated implementation, reduced computational requirements, reduced latency, an improved user experience, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating an output video stream, the apparatus comprising: a processor for providing a plurality of reference video streams for a plurality of reference viewpoints for a scene; a receiver for receiving a viewpoint request from a remote client, the viewpoint request being indicative of a requested viewpoint of the scene for the output video stream; a generator for generating an output video stream comprising a first video stream comprising first output frames from a first reference video stream of the plurality of reference video streams for a first viewpoint and a second video stream comprising second output frames from a second reference video stream of the plurality of reference video streams for a second reference viewpoint, the second output frames being differentially encoded relative to the first output frames and the first output frames not being differentially encoded relative to the second output frames; and a controller for determining the first viewpoint and the second viewpoint as viewpoints of the plurality of reference viewpoints in response to the viewpoint request; wherein the controller is arranged to, in response to a detection during the generation of the output video stream of a change in the viewpoint request meeting a criterion, change the first viewpoint from being a first reference viewpoint of the plurality of reference viewpoints and the second viewpoint from being a second reference viewpoint of the plurality of reference viewpoints to the first viewpoint being the second reference viewpoint and the second viewpoint being the first reference viewpoint; wherein the apparatus is arranged to include a number of additional video streams in the output video stream, each additional video stream comprising output frames from an additional reference video stream of the plurality of reference video streams differentially encoded relative to the first output frames; and wherein the controller is arranged to determine the number of additional video streams in response to at least one of: a variation measure for the viewpoint request, and a latency measure for a communication channel for transmitting the output video stream.

The invention may provide improved and/or more useful generation of a video stream representing a scene. It may provide additional or redundant information which may support or facilitate remote synthesis of images based on the output video stream. The approach may allow an efficient support of a VR service and/or may reduce the overall data rate while maintaining a high degree of flexibility for remote image synthesis.

The approach may for example support an improved client server based VR service wherein final synthesis of the images are performed at the client side.

The approach may in particular reduce transition artefacts when switching between different anchor viewpoints. For example, when switching from one anchor viewpoint to another, both anchor video streams may continuously be provided before, during, and after the switch with only the encoding of these changing.

The system may be arranged to dynamically perform the operations to provide a dynamic adaptation of the output video stream.

In accordance with an optional feature of the invention, the first output frames are encoded without reference to frames for other reference viewpoints than the first viewpoint.

This may provide improved operation in many embodiments.

In accordance with an optional feature of the invention, the first output frames are intracoded.

This may provide improved operation in many embodiments and may specifically reduce latency as decoding latency may be reduced. An intracoded frame may be a frame encoded independently of all other frames.

In accordance with an optional feature of the invention, some of the first output frames are differentially encoded relative to other frames of the first output frames.

This may provide improved performance in many embodiments, and may specifically reduce the overall data rate for the output video stream.

In accordance with an optional feature of the invention, the output generator is arranged to generate the second output frames by differentially encoding frames from the second reference video stream relative to the first output frames.

This may provide efficient and adaptive operation and may in particular be suitable for real time applications, such as real time multicast applications.

In accordance with an optional feature of the invention, the processor is arranged to store differentially encoded versions of at least some of the plurality of reference video streams, a differentially encoded version of a reference video stream comprising frames differentially encoded with respect to frames of another reference video stream; and the generator is arranged to generate the second video stream in response to retrieving a differentially encoded version of the second reference video stream being a version of the second video stream comprising frames differentially encoded relative to frames of the first reference video stream.

This may provide a more efficient operation in many embodiments and may specifically reduce computational complexity and resource requirements. It may be particularly suitable for applications in which the apparatus generates different output video streams for multiple clients.

In some embodiments, the processor may be arranged to store the plurality of anchor video streams and a number of differentially encoded anchor video streams of at least one of the plurality of video streams being differentially encoded relative to video streams for other viewpoints; and the generator may be arranged to generate the first bitstream from a retrieved video stream selected from the plurality of video streams based on the viewpoint request and to generate the second bitstream from a retrieved differentially encoded video stream being differentially encoded with respect to a viewpoint of the retrieved video stream.

In accordance with an optional feature of the invention, the processor is arranged to store the plurality of reference video streams as files and the controller is arranged to select the first reference video stream and the second reference video stream in response to a file retrieval request of the viewpoint request, the file retrieval request being indicative of a stored file comprising a reference video stream.

This may in many embodiments provide an efficient and low complexity implementation.

In accordance with an optional feature of the invention, the controller is arranged to change the first viewpoint in response to distances between the requested viewpoint and the plurality of reference viewpoints.

This may provide highly advantageous operation in many embodiments.

In accordance with an optional feature of the invention, the controller is arranged to change the first viewpoint in response to a rate of change for the requested viewpoint.

This may provide highly advantageous operation in many embodiments.

In accordance with an optional feature of the invention, the controller is arranged to change the first viewpoint in response to a latency measure.

This may provide highly advantageous operation in many embodiments.

The latency measure may be indicative of a latency measure for the communication channel for transmitting the output video stream. The latency measure may be indicative of a latency of the processing of the apparatus, and may be an indication of a delay between receiving a viewpoint request and adapting the output video stream based on that viewpoint request.

The apparatus is arranged to include a number of additional video streams in the output video stream, each additional video stream comprising output frames from an additional reference video stream of the plurality of reference video streams differentially encoded relative to the first output frames; and wherein the controller is arranged to determine the number of additional video streams in response to a latency measure for a communication channel for transmitting the output video stream.

This may provide improved performance in many embodiments and may specifically provide an improved dynamic adaptation of the data rate to the current conditions.

The apparatus is arranged to include a number of additional video streams in the output video stream, each additional video stream comprising output frames from an additional reference video stream of the plurality of reference video streams differentially encoded relative to the first output frames; and wherein the controller is arranged to determine the number of additional video streams in response to a variation measure for the viewpoint request.

This may provide improved performance in many embodiments and may specifically provide an improved dynamic adaptation of the data rate to the current conditions.

Apparatus for rendering a video stream may comprise: a receiver for receiving the video stream, the video stream comprising a first video stream comprising first frames representing frames for a first viewpoint of a scene and a second video stream comprising second frames for the scene from a second viewpoint, the second frames being differentially encoded relative to the first frames and the first frames not being differentially encoded relative to the second frames; a renderer for rendering output view images for a viewpoint in response to the first video frames and the second video frames; a detector for detecting a change in the video stream from the first viewpoint corresponding to a first reference viewpoint and the second viewpoint corresponding to a second reference viewpoint to the first viewpoint corresponding to the second reference viewpoint and the second viewpoint corresponding to the first reference viewpoint; and an adapter for adapting the rendering in response to the detection.

The renderer may be arranged to synthesize the view images using viewpoint shifting applied to at least one of the first frames and the second frames.

The adapter may be arranged to adapt the viewpoint shifting to compensate for a change in viewpoint for at least one of the first frames and the second frames.

According to an aspect of the invention there is provided a method of generating an output video stream, the method comprising: providing a plurality of reference video streams for a plurality of reference viewpoints for a scene; receiving a viewpoint request from a remote client, the viewpoint request being indicative of a requested viewpoint of the scene for the output video stream; generating an output video stream comprising a first video stream comprising first output frames from a first reference video stream of the plurality of reference video streams for a first viewpoint and a second video stream comprising second output frames from a second reference video stream of the plurality of reference video streams for a second reference viewpoint, the second output frames being differentially encoded relative to the first output frames and the first output frames not being differentially encoded relative to the second output frames; determining the first viewpoint and the second viewpoint as viewpoints of the plurality of reference viewpoints in response to the viewpoint request; and wherein determining the first viewpoint and the second viewpoint comprises changing, in response to a detection during the generation of the output video stream of a change in the viewpoint request meeting a criterion, the first viewpoint from being a first reference viewpoint of the plurality of reference viewpoints and the second viewpoint from being a second reference viewpoint of the plurality of reference viewpoints to the first viewpoint being the second reference viewpoint and the second viewpoint being the first reference viewpoint, the method further comprising including a number of additional video streams in the output video stream, each additional video stream comprising output frames from an additional reference video stream of the plurality of reference video streams differentially encoded relative to the first output frames; and determining the number of additional video streams in response to at least one of a variation measure for the viewpoint request, and a latency measure for a communication channel for transmitting the output video stream.

A method of rendering a video stream may comprise: receiving the video stream, the video stream comprising a first video stream comprising first frames representing frames for a first viewpoint of a scene and a second video stream comprising second frames for the scene from a second viewpoint, the second frames being differentially encoded relative to the first frames and the first frames not being differentially encoded relative to the second frames; rendering output view images for a viewpoint in response to the first video frames and the second video frames; detecting a change in the video stream from the first viewpoint corresponding to a first reference viewpoint and the second viewpoint corresponding to a second reference viewpoint to the first viewpoint corresponding to the second reference viewpoint and the second viewpoint corresponding to the first reference viewpoint; and adapting the rendering in response to the detection.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
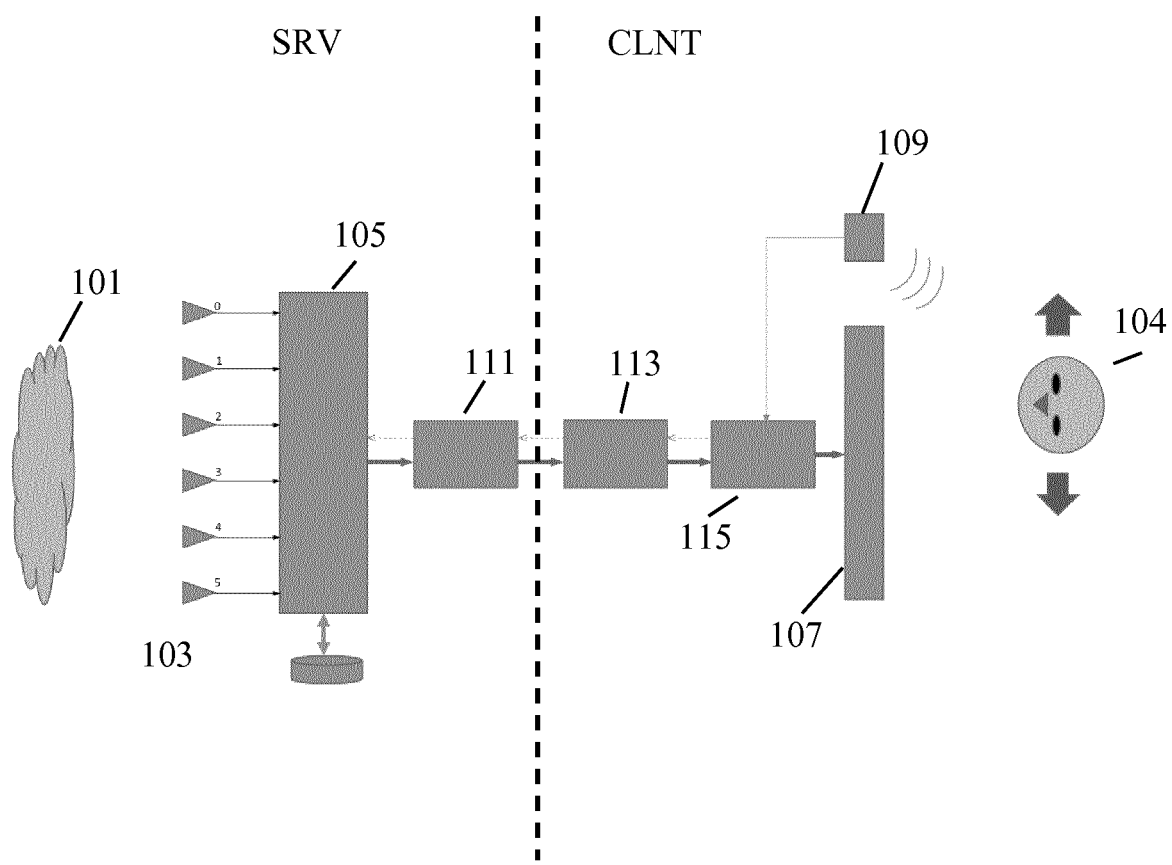
FIG. 1 illustrates an example of a capture and playback system for free viewpoint visualization.

Virtual experiences allowing a user to move around in a virtual world are becoming increasingly popular and services are being developed to satisfy such a demand. However, provision of efficient virtual reality services is very challenging, in particular if the experience is to be based on a capture of a real-world environment rather than on a fully virtually generated artificial world.

In many virtual reality applications, a viewer pose input is determined reflecting the pose of a virtual viewer in the virtual scene. The virtual reality apparatus/system/application then generates one or more images corresponding to the views and viewports of the virtual scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, one or more view images may e.g. be presented on an autostereoscopic display, or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset.

In some systems, the viewer pose may be provided by manual means, e.g. by the user manually controlling a joystick or similar manual input. For example, the user may manually move the virtual viewer around in the virtual scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In many systems, the scene may be represented by image data corresponding to views captured from different capture poses. For example, for a plurality of capture poses, an image or video sequence may be captured or stored. As an example, a sports event may be captured for broadcasting as a virtual reality experience (or to support such an experience) by a plurality of cameras capturing the event from different positions (or poses) and generating captured video sequences. The set of video sequences may be broadcast in real time or may e.g. be stored for retrieval at a later stage. In systems where the scene is described/referenced by view data stored for discrete reference viewpoints/positions/poses, these are in the field also referred to as anchor viewpoints/positions/poses and in the following the terms reference and anchor will be used as equivalent/identical. Typically, when a real world environment has been captured by capturing images from different points/positions/poses, these capture points/positions/poses are also the reference/anchor points/positions/poses.

In the field, the terms placement and pose are used as a common term for position and/or direction/orientation. The combination of the position and direction/orientation of e.g. an object, a camera, a head, or a view may be referred to as a pose or placement. The term viewpoint is also generally used in the art to indicate the origin for a view. The term is often used to indicate a position from which the view is seen but it also typically includes an orientation, and indeed may only be an orientation. Thus, the pose or placement providing the basis for a view or image is generally referred to as the viewpoint for the view or image.

Thus, a placement or pose indication for an object may comprise six values/components/degrees of freedom with each value/component typically describing an individual property of the position/location or the orientation/direction of the corresponding object. If the object is the basis of a view, e.g. it represents a camera or a viewer (virtual or real), the viewpoint of the object may be represented by the corresponding pose or placement of the object.

Of course, in many situations, a placement, pose or viewpoint may be considered or represented with fewer components, for example if one or more components is considered fixed or irrelevant (e.g. if all objects are considered to be at the same height and have a horizontal orientation, four components may provide a full representation of the pose of an object). In the following, the terms pose and viewpoint are used to refer to a position and/or orientation which may be represented by one to six values (corresponding to the maximum possible degrees of freedom).

A system or entity based on providing the maximum degree of freedom for the viewer is typically referred to as having 6 Degrees of Freedom (6DoF). Many systems and entities provide only an orientation or position and these are typically known as having 3 Degrees of Freedom (3DoF).

In many implementations, the VR application is distributed across different entities/devices, and specifically may be implemented using a client server configuration. For example, a device local to the user may detect/receive movement/pose data which is processed to generate the viewer pose which is then transmitted to the remote device. The remote device may then generate suitable view images for the viewer pose based on scene data describing the scene data. For example, it may select one of the anchor points closest to the viewer pose and transmit this to the local client device which may possibly directly present the received video stream.

A server may be considered a function, process, method, apparatus, computer, or computer program that manages access to a centralized resource or service in a network, such as in the specific case providing access to video streams representing a scene. A client may be considered a function, process, method, apparatus, computer, or computer program that is capable of obtaining information and applications from a server, such as as in the specific case obtaining video streams representing a scene.

Figure 2:
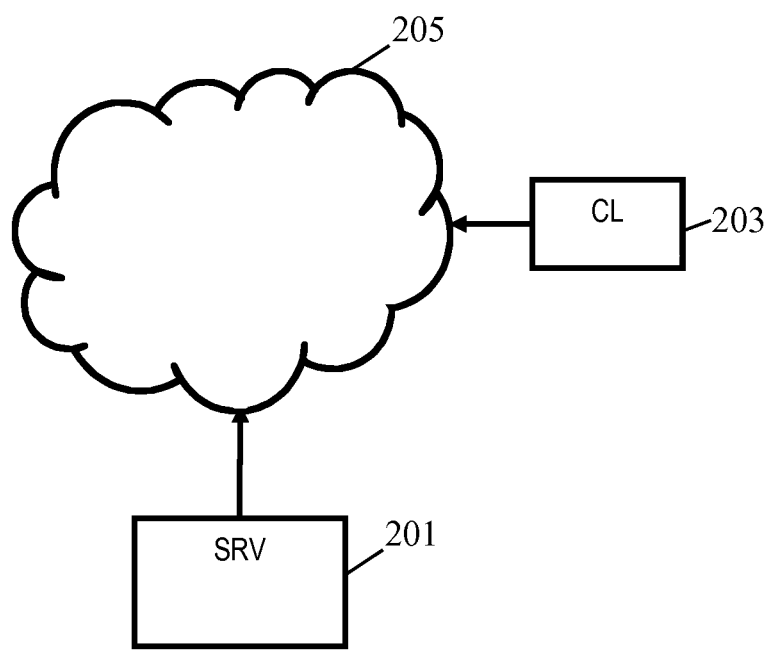
FIG. 2 illustrates an example of client server arrangement for providing a virtual reality experience.

FIG. 2 illustrates such an example of a VR system in which a remote VR server 203 liaises with a client VR device 201 e.g. via a network 205, such as the Internet. The remote VR server 203 may be arranged to simultaneously support a potentially large number of client VR devices 201.

The system of FIG. 1 may specifically be used to implement the approach of FIG. 1 and the following description will be based on such a system.

An approach such as that of FIG. 2 may in many scenarios provide an improved trade-off e.g. between complexity and resource demands for different devices, communication requirements etc. For example, the viewer's current viewpoint and corresponding scene data may be transmitted with larger intervals with the local device processing the viewpoint and received scene data locally to provide a real time low lag experience. This may for example reduce the required communication bandwidth substantially while allowing the scene data to be centrally stored, generated, and maintained. It may for example be suitable for applications where a VR experience is provided to a plurality of remote devices, such as e.g. VR broadcast services or applications, such as e.g. the broadcast of a sports event as a VR service where the user can change position.

However, as previously described such systems may introduce latencies. For example, if the viewpoint changes from being close to a first anchor pose to a second anchor pose this will result in the server changing from providing the video stream for the first anchor pose to the video stream for the second anchor pose. However, from the client point of view, the change from one video stream to another video stream occurs with a latency that is dependent both on the network (round trip) delay as well as on any decoding delay. Such delays may be substantial and very perceptible. For example, when moving to cause a shift of the user viewpoint from one anchor pose to another, the shift may actually occur with a significant and perceptible delay. Even in approaches where local view shifting is performed based on the current viewpoint and the received video stream (and the pose of this), the increased view shifting required will cause a quality reduction. Addressing the latency issue by the server transmitting multiple video streams substantially increased the bandwidth and resource usage.

In the following an approach will be described with reference to FIG. 2 (and FIG. 1) which in many scenarios may provide reduced latency while maintaining a low bandwidth and resource requirements. The approach may specifically utilize redundant video streams with a dynamically adaptive encoding approach to provide an improved trade-off between latency and bandwidth/resource requirements.

Figure 3:
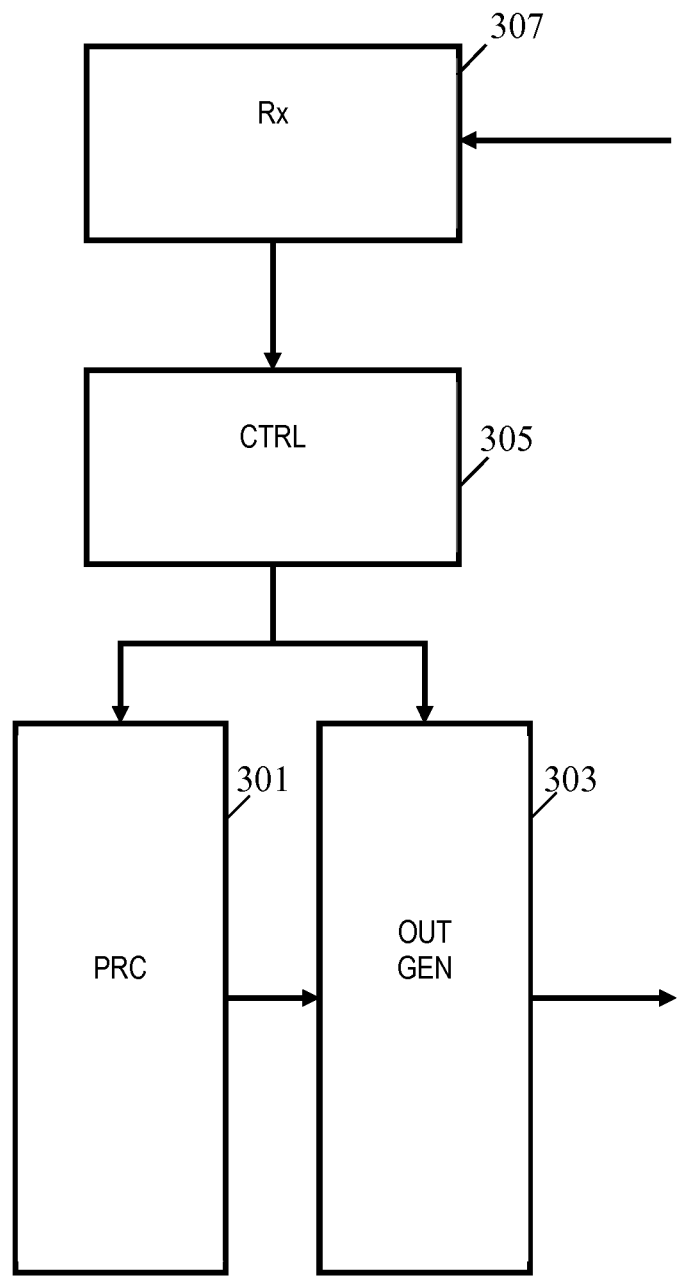
FIG. 3 illustrates an example of elements of a server apparatus in accordance with some embodiments of the invention.
Figure 4:
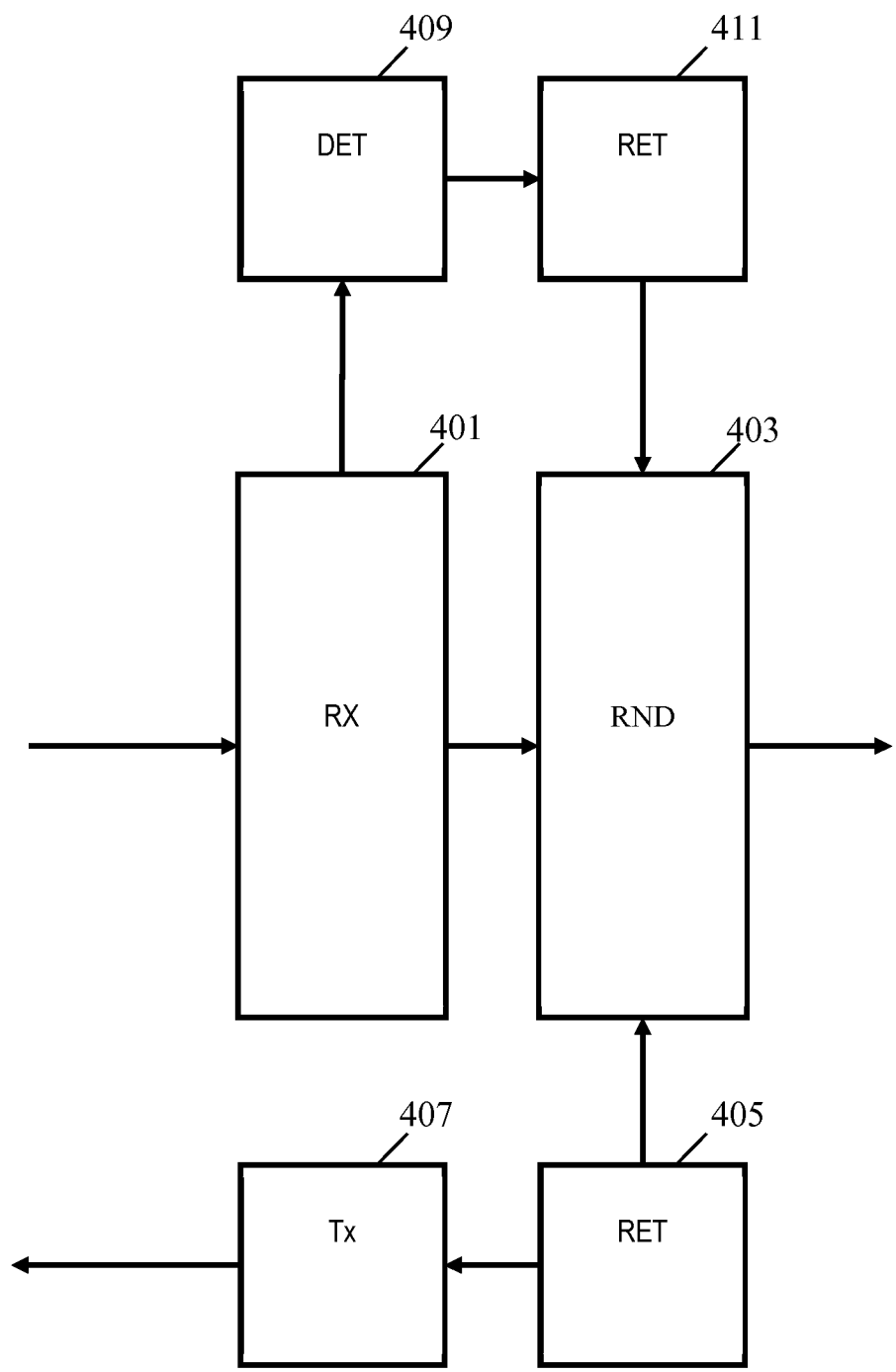
FIG. 4 illustrates an example of elements of a client apparatus in accordance with some embodiments of the invention.

FIG. 3 illustrates an example of elements of the server 201 and FIG. 4 illustrates examples of elements of the client 203 of such an embodiment.

In the example, the server 201 comprises a processor 301 for providing a plurality of anchor video streams for a plurality of anchor viewpoints for a given scene. Thus, for each of a plurality of anchor viewpoints, the processor 301 can provide an anchor video stream representing the views of the scene from that viewpoint. It will be appreciated that the term anchor in the field merely is a label that do not have any other implication than referring to the plurality of video streams (i.e. it corresponds to describing that the processor 301 can provide a plurality of video streams for a plurality of viewpoints for a given scene, and that indeed the term anchor could be replaced by another label, such as e.g. the term "first"). However, in many embodiments, the anchor viewpoints and video streams may be capture viewpoints and capture video streams generated by capturing video streams from the capture viewpoints. The may specifically be viewpoints for cameras capturing a real time event.

The server 201 further comprises an output generator 303 which is arranged to generate an output video (data)stream comprising video representing the scene. The output video stream may be transmitted to the client 203 which may proceed to render a video of the scene, possibly by directly rendering the received output video stream (or possible after first performing some manipulation such as for example performing some viewpoint shifting).

The server 201 further comprises a receiver 305 which is arranged to receive a viewpoint request from the client 203 where the viewpoint request is indicative of a requested viewpoint of the scene for the output video stream. Thus, the client 203 may dynamically determine a viewpoint from which it is desired that the scene is viewed, i.e. from which viewpoint the rendered images should be generated. A viewpoint request is then generated to indicate the desired viewpoint and this is may then be transmitted to the server 201 which is indictive of the desired viewpoint.

The server 201 is arranged to generate the output video stream in response to the received viewpoint request. Specifically, the apparatus comprises a controller 307 which is coupled to the receiver 305, the output generator 303 and the processor 301. The controller 307 is specifically arranged to select anchor video streams from the plurality of anchor video streams in response to the viewpoint request and to control the representation of these in the output video stream.

The server 201 of FIG. 2 is arranged to dynamically generate the output video stream to comprise at least two of the anchor video streams where one of the anchor video streams is encoded relatively to the other. Specifically, the output video stream is generated to include frames from a first of the anchor video steam and frames from a second of the anchor video stream where the frames from the second anchor video stream are encoded relative to the frames from the first video stream. However, the frames from the first anchor video stream are not encoded relative to frames from the second anchor video stream (although they may in some embodiments be encoded relative to other frames from the first anchor video stream itself or even relative to frames from another anchor video stream.

The output video stream is especially in many embodiments generated such that it comprises a first video (data/bit)stream which is encoded without being relative to any other video (data/bit)stream, i.e. it is encoded non-differentially with respect to any other video stream comprised in the output video stream. This first video stream will be referred to as the main video stream. In addition, the output video stream is generated to comprise at least a second video stream which is encoded relative to the main video stream. This video stream will be referenced to as the differential video stream and may specifically be a video stream which is encoded differentially with respect to the main video stream. In some embodiments, the output video stream may comprise additional video streams and specifically may comprise additional differential video streams that have been encoded relative to the main bitstream.

It will be appreciated that different approaches for differentially encoding the differential bitstreams may be used in different embodiments. As a specific low complexity example, a residual frame may be generated for a differential video stream by a pixel wise subtraction of the corresponding frame of the main video stream from the frame to be encoded. The resulting residual or error frame may then be encoded. As the residual values will tend to be significantly smaller than the original values (as the frames are likely to closely resemble each other as they are viewing the same scene from often relatively close viewpoints), the encoding may be performed with a significantly reduced data rate.

It will be appreciated that in most practical differential encoding schemes more advanced approaches may be used, including for example matching segments in the different frames and determining the residual values by subtracting matching segments etc. Such an approach may for example be used to reflect parallax shifts between anchor video streams in order to provide a more efficient encoding. The encoded data may in addition to the residual values include information on the relative offset between different segments (e.g. represented by vectors).

The controller 307 may be arranged to dynamically select a first of the anchor video streams from which to generate the main video stream. Typically, the controller 307 will select the anchor video stream for the anchor viewpoint that most closely correspond to the viewpoint request. The main video stream is generated to comprise the frames of the selected first anchor video stream and may specifically be generated by directly including the selected first anchor video stream into the output video stream although it will be appreciated that in some embodiments the frames may be modified (e.g. change of dynamic range or resolution) and in some embodiments the main video stream may be generated to have more or fewer frames than the selected first anchor video stream (e.g. by interpolation or subset selection).

In addition, the controller 307 may dynamically select a second of the anchor video streams from which to generate the differential video stream (or may in some embodiments select a plurality of anchor video streams for different differential video streams). Typically, the controller 307 will select the second anchor video stream as a neighbor of the first anchor video stream (that was selected for the main video stream).

The differential video stream is accordingly generated to comprise frames from the second anchor video stream. As for the main video stream some modifications may be introduced (such as a frame rate conversion, dynamic range change, or resolution) but in most embodiments, frames of the differential video stream are typically generated to directly correspond to the frames of the second anchor video stream.

However, the frames for the differential video stream are encoded relative to the frames from the main video stream. Thus, the frames from the second anchor video stream are included in the output video stream in a differentially encoded format with respect to the frames from the first anchor video stream. The first anchor video stream is for a first anchor viewpoint and the second anchor video stream is for a second anchor viewpoint and thus the output video stream is generated with a main video stream corresponding to the first anchor viewpoint and a differential video stream with differentially encoded frames corresponding to the second anchor viewpoint.

The controller 307 may thus be arranged to dynamically and in response to the viewpoint request select which of the anchor video stream is encoded as the main (non-differentially encoded) video stream and which of the anchor video streams is(are) encoded differentially relative to the main video stream.

Further, the controller 307 is arranged to dynamically adapt the selection such that it will change in response to changes in the viewpoint request. Specifically, the controller 307 may initially select the capture video stream for the main video stream to be the first anchor video stream because the first anchor viewpoint is the anchor viewpoint closest to the viewpoint request. Further, the second anchor video stream is selected for the differential video stream because the second viewpoint is a neighbor viewpoint to the first viewpoint, and typically it may be the nearest neighbor (or belong to a set of a predetermined number of neighbors, e.g. for the anchor viewpoints being arranged in a line the two nearest viewpoints may be selected for generation of differential video streams).

However, if the viewpoint request now changes to be closer to the second viewpoint, the controller 307 may at some point switch such that the main video stream is selected to correspond to the second viewpoint, i.e. the second anchor video stream will be used for the main video stream. Thus, the controller 307 will switch the main video stream from the first to the second anchor video stream thereby switching it to an anchor video stream that is closer to the current requested viewpoint and which accordingly provides a better basis for the rendering at the client 203. In addition, the controller 307 switches the differential video stream to be based on the anchor video stream for the second viewpoint to be for the first viewpoint. Thus, the controller 307 may effectively switch between which of the capture video streams is provided as a non-differentially encoded video stream and which is encoded as a relative video stream.

The server 201 may thus continuously during the change provide video streams for the same two anchor viewpoints but will change which of these is represented differentially. Thus, the output video stream is continuously during the transition generated to include both the initial anchor video stream and the destination anchor video stream but with these switching between being the main video stream and the differential video stream, i.e. switching between which are differentially and non-differentially encoded. The approach of maintaining the presence of both video streams in the output video stream but switching between which one is the main video stream and which one is the differential video stream may provide improved performace in many embodiments. In particular, it may provide increased consistency and improved and/or facilitated rendering at the client side. Indeed, for the rendering, the same video streams are continuously present and thus the same basis for view synthesis renedering is available. In a case where e.g. a viewpoint is slowly and gradually moving from the viewpoint of one video stream to the viewpoint of the neighbor video stream, a very smooth and efficient transition can be achieved with typically no perceptible side effects when switching between video streams.

FIG. 4 illustrates an example of elements of the client 203. The client 203 is in the example implemented in a client device which may be arranged to dynamically render images received from the server 201.

The client 203 comprises a receiver 401 which is arranged to receive the output video stream from the server 201. Thus, a video stream is received which comprises at least a main video stream comprising frames for one viewpoint and a differential video stream which comprises frames for a second viewpoint and where the frames are differentially encoded with respect to the frames of the main video stream.

The client further comprises a renderer 403 which is arranged to render output view images based on the received video streams. The output view images may specifically be provided in a format that allows them to be directly displayed on a suitable display. For example, the output view images may be generated and included in a bitstream in accordance with a suitable standard, such as e.g. in accordance with the HDMI or DisplayPort standard.

The renderer 403 is arranged to generate the output view images to correspond to a rendering viewpoint. The rendering viewpoint will typically not directly correspond to a viewpoint of one of the received video streams and therefore the renderer 403 will in most embodiments comprise functionality which is arranged to perform image synthesis in which an image/frame for the rendering viewpoint is generated from at least one of the frames of the main video stream and the differential video stream, i.e. based on an image frame from the main anchor viewpoint or differential anchor viewpoint. Typically, the image is synthesized based on images/frames from both viewpoints, i.e. based on both the main video stream and the differential video stream.

The renderer 403 may accordingly be arranged to perform viewpoint shifting etc. to synthesize an image from a new viewpoint. It will be appreciated that the skilled person will be aware of many different approaches and algorithms for such view shifting/synthesis and that any suitable approach may be used.

The renderer 403 further comprises means for decoding the received output video stream and the main video stream and differential video stream as appropriate. Thus, specifically, the renderer 403 is arranged to perform differential decoding to generate the frames of the differential video stream based on the frames of the main video stream.

In most embodiments, the rendering viewpoint may change dynamically and the client 203 comprises a viewpoint input 405 which receives an input and generates the rendering viewpoint. The input may typically be a user input such as a manual input from a user input device, e.g. a game controller, which can be used by a user to manually and dynamically change and control the rendering viewpoint. As another example, the viewpoint input 405 may comprise eye tracking functionality or e.g. receive movement information from a VR headset and it may in response generate the rendering viewpoint.

Thus, the rendering viewpoint may continuously be updated and changed to reflect the changes in the desired viewpoint for the user, e.g. by adapting to follow the user's movement. The rendering viewpoint data is fed to the renderer 403 such that this dynamically changes to generate the output images that correspond to the current rendering viewpoint.

The user input 405 is further coupled to a transmitter 407 which is arranged to generate a viewpoint request and transmit this to the server 201. In many embodiments, the transmitter 407 may be arranged to simply directly transmit the current rendering viewpoint to the server 201. The server 201 may then directly compare this rendering viewpoint to the anchor viewpoint in order to select the anchor viewpoints for respectively the main video stream and the differential video stream(s).

In other embodiments, the client 203 may for example directly request one of the anchor video streams as the main anchor video stream and the server 201 may directly provide the requested anchor video stream as a main video stream and supplement it with differential video streams as appropriate. For example, when the service was set up, the server 201 may provide data of all the anchor viewpoints to the client 203 and the client may proceed to compare the current rendering viewpoint to the anchor viewpoints and request the anchor video stream for the closest anchor viewpoint.

Thus, the client 203 receives the output video stream comprising the main video stream and at least one differential video stream and from this it locally generates output images for the current rendering viewpoint. However, as previously described, the selection of the anchor video streams for the main and differential video streams is not fixed but may change dynamically.

The client 203 accordingly comprises a detector 409 which is arranged to detect when the anchor video stream selected for the main video stream and the anchor video stream selected for the differential video stream by the server 201 changes.

Typically, the received output video stream will comprise data indicative of which anchor video streams or anchor viewpoints are selected for respectively the main video stream and the differential video stream and the detector 415 may simply evaluate such meta-data to detect when a change occurs. In other embodiments, no such data may be provided and the detector 415 may e.g. be arranged to detect a sudden shift in the images which may correspond to a parallax shift. For example, in an embodiment where the client 203 directly requests one anchor video stream as the main video stream, the detector 415 may be informed by the transmitter 407 when a new anchor video stream is requested. It may then proceed to monitor the frames of the main video stream and/or the differential video stream to detect when image objects/segments appear to shift suddenly between consecutive frames as this may indicate the change in parallax when a change in viewpoint occurs. The detection may specifically consider both the main video stream and the differential video stream to detect situations where sudden shifts in the two streams correspond to each other but have opposite signs as this will reflect that the parallax shift in the main video stream is the opposite of the differential video stream as the viewpoints of the two video streams are swapped around.

In embodiments where the view-selection logic is implemented in the client 203, then the detector 415 may implicitly determine the change based on local information only. In that case, the client 203 knows its position/pose relative to the anchor positions/poses and may simply retrieve different data from the server 201 depending on the position/pose. In that case, the switching is entirely implemented in the client and the only thing that may be assumed about the server data is how the area is organized (e.g. with redundant side views) enabling the client 203 to select the appropriate video stream. In such a case, the detector 415 may directly detect the change in response to the client 203 itself requesting a new video stream, e.g. with a delay to reflect the round-trip delay.

The detector 409 is coupled to an adapter 411 which is further coupled to the renderer 403. The adapter 411 is arranged to adapt the rendering in response to the detection that a change has occurred in the viewpoints of the main video stream and the differential video stream. Specifically, it is arranged to adapt the synthesis operation such that this takes into account that the viewpoints for the main video stream and the differential video stream have changed. It may for example do this by switching the rendering/synthesis to be based on the main video stream rather than on the differential video stream.

This may specifically in many embodiments correspond to switching from performing the viewpoint shift based on the differential video stream to be based on the main video stream. For example, if the rendering viewpoint gradually moves from the viewpoint of the main video stream, say viewpoint 2, towards that of the viewpoint of the differential video stream, say viewpoint 3, the renderer 403 will at some point switch from synthesizing the image from the frames of the main video stream to synthesize it based on the frames of the differential video stream as these are from a closer viewpoint. It may accordingly begin to decode the differential video stream in addition to decoding the main video stream (as this is still required in order to decode the differential video stream).

The server 201 may further detect that the viewpoint request now indicates a viewpoint closer to the viewpoint of the differential video stream (viewpoint 3) rather than that of the main video stream (viewpoint 2). It may accordingly switch such that the main video stream is now generated from the frames of the anchor video stream of viewpoint 3. Further the differential video stream will be generated from the frames of the anchor video stream for viewpoint 2.

The detector 409 may detect when this change reaches the client 203 and in response to this detection the adapter 411 may control the renderer 403 to switch from synthesizing the output image based on the differential video stream to be based on the main video stream. Further, as the differential video stream now corresponds to the previous viewpoint (viewpoint 2), this anchor video stream is still provided to the client 203 by means of the differential video stream and thus can readily be retrieved if the desired rendering viewpoint reverses back towards viewpoint 2.

In the system, the controller 307 is thus arranged to change the first viewpoint from being a first reference viewpoint of the plurality of reference viewpoints and the second viewpoint from being a second reference viewpoint of the plurality of reference viewpoints to the first viewpoint being the second reference viewpoint and the second viewpoint being the first reference viewpoint. The controller 307 is arranged to effect this change in response to a detection during the generation of the output video stream of a change in the viewpoint request meeting a criterion.

It will be appreciated that the described approaches can be used with any criterion for switching between which video stream/viewpoint is used as the main video stream/viewpoint and which is used as a differential video stream/viewpoint.

In many embodiments, the criterion may comprise a consideration of a distance between the reference viewpoints and the (current) viewpoint request. Specifically, in some embodiments, the viewpoint request may directly be a request identifying one of the reference viewpoints, and a change between main and differential viewpoints/video streams may simply result from the viewpoint request changing to request a different viewpoint.

In many embodiments, the viewpoint request may be an indication of a viewpoint as a position in a coordianate system also comprising the reference viewpoints (e.g. a coordinate system for a virtual reality scene). In such embodiments, the criterion may include a consideration of the distance to each of the reference viewpoints, and the controller 307 may be arranged to currently select the closest reference viewpoint in accordance with a suitable distance criterion. Thus, if the controller 307 continuously selects the closest reference viewpoint as the main viewpoint, a criterion for changing the main viewpoint may simply be that the requested viewpoint is closer to a different reference viewpoint.

In many embodiments, the controller 307 may perform an algorithm including applying a criterion or rule for selecting the main viewpoint. The detection of the change in the viewpoint request meeting a criterion may correspond to a detection that the criterion for selecting the main viewpoint has resulted in a different viewpoint being selected as the main viewpoint. In other words, the criterion used to detect that a change in the viewpoint request has occurred and that a change in the reference viewpoints should be executed may be an evaluation of whether the criterion for selecting the reference viewpoint has resulted in a different viewpoint being selected. Specifically, continously selecting and using a current reference viewpoint based on a given criterion or algorithm considering the viewpoint requests may inherently also be a criterion for detecting when a change in viewpoint selected for the reference viewpoint should be changed from a first viewpoint to a second viewpoint.

Thus, in many embodiments, the selection and change of the main viewpoint and differential viewpoint may be based on, or consider, (spatial) proximity. For example, a simple criterion can be used of: If the eye of the viewer (as indicated by the viewpoint request) is spatially closer to reference viewpoint A than to reference viewpoint B, then viewpoint A is selected as the first reference and viewpoint B is encoded relative to viewpoint A.

In some embodiments, more complex algorithms may be taken into account.

For example, a prediction model may be generated that based on the viewpoint requests and a reasonable model for eye movements is used to predict the direction of changes of the viewpoints of the user. The switching may then be based on such prediction rather than on the original observed position measurements. This may provide a faster and preemptive switching.

In some embodiments, the criterion for switching may include a consideration of a rate of change of the viewpoint requests. For example, if the eye moves at a high speed this will result in a high rate of change for the viewpoint requests. In this case, it may be desirable to predict future viewpoint requests and due to the higher speed, the switching may be made earlier.

In some embodiments, the system/communication latency may be taken into account. The latency may play an indirect role and may be taken into account in the selection/switch criterion. This may typically be combined with consideration of the current position and current rate of change of the viewpoint requests.

The latency measure may be indicative of a latency measure for the communication channel for transmitting the output video stream. The latency measure may be indicative of a latency of the processing of the apparatus, and may be an indication of a delay between receiving a viewpoint request and adapting the output video stream based on that viewpoint request.

For example, in a scenario where three video streams are used of which the second and third are coded differently with respect to the first video stream, a transmission latency could be to high to allow fast enough view-point switching. At the expense of a higher bandwidth, the system can decide to instead send 5, 7, 9 or more more views. Now only the decoding hardware needs to be fast enough but the data have already been received. In such situations, the switch of reference video streams may be less frequent when a high communication latency is detected than when a low communication latency is detected. The approach may provide an improved trade-off between data rate, bandwidth, resource requirements on one hand and the possible rendering quality for changing rendering viewpoints.

The system may use (at least partially) redundant video streams to solve latency issues at the client side. It may provide differentially encoded neighboring anchor views for each main view to compensate for transmission and decoding delay. The neighboring views may be encoded differentially with respect to each other in such a structure that the number of decoding steps (decoding complexity) is low when switching between views. The approach may reduce latency at the client side at the expense of multi-view coding efficiency at the server side while keeping bandwidth usage under control. An example of the approach may be described with reference to FIG. 5. In this example the main video stream is intra-coded such that each frame of the main video stream can be decoded without any reference to any other frame, whether for the same viewpoint or from another viewpoint. The example is based on a set of anchor viewpoints (which specifically may be the camera positions when the scene was captured) being arranged in a straight line.

In the example, the video packets are generated by selecting frames and video packets from the anchor video streams. The controller 307 selects one of the cameras/capture viewpoints as the main viewpoint. Specifically, it dynamically selects the viewpoint closest to the viewpoint request. The video packets for this main viewpoint are included in the output video stream as intracoded packets/frames (indicated by I in FIG. 5), i.e. as the main video stream. In addition, the two neighboring viewpoints are selected as differential viewpoints and video packets/frames from the two corresponding anchor video streams are also included in the output video stream as differential video streams. However, for these viewpoints, the encoded video packets/frames are differentially encoded with respect to the video packets/frames of the main viewpoint (and are indicated by D in FIG. 5). A Group Of Pictures (GOP) structure is accordingly generated which is spatial (vertically depicted in FIG. 5) instead of temporal. Thus, these viewpoints/video streams are represented by more efficiently encoded video streams.

The selection of the main, and consequentially the differential viewpoints, is dynamically updated to reflect changes in the received viewpoint request. For example, in FIG. 5, the initial situation (at t=t0) is that the client 203 requests a viewpoint corresponding to viewpoint 2. It accordingly receives an intra-coded frame for viewpoint 2 and differentially encoded frames for viewpoints 1 and 3. The differential encoding of viewpoints 1 and 3 are relative with respect to viewpoint 2. This allows low-latency viewpoint switching as only an additional decoding step is needed to generate images for view 1 or 3 since the data for these is provided as part of the output video stream from the server 201.

In the example, the desired viewpoint may switch from viewpoint 2 to viewpoint 3 (or from closer to viewpoint 2 to be closer to viewpoint 3). In the example of FIG. 4 a change from viewpoint 2 to viewpoint 3 may occur at t1 and accordingly the viewpoint request transmitted to the server 201 may change from a request for viewpoint 2 to a request for viewpoint 3.

When the server 201 receives this changed viewpoint request it proceeds to select anchor viewpoint 3 as the main viewpoint. Accordingly, it switches such that the main video stream now corresponds to the anchor video stream for viewpoint 3 rather than viewpoint 2, and thus the video packets/frames for viewpoint 3 are now included in the output video stream as intra-coded video packets/frames. However, in addition, the previous main viewpoint is now selected as one of the differential viewpoints and the video packets/frames for viewpoint 2 are still included in the output video stream but they are now encoded differentially with respect to the video packets/frames of viewpoint 3. Thus, the two streams have switched between being intra-coded and relatively/differentially coded. In addition, the controller 307 switches to select viewpoint 4 as a differential viewpoint instead of viewpoint 1. Following the changes, the main video stream accordingly corresponds to viewpoint 3 with the differential video streams corresponding to viewpoints 2 and 4.

However, due to the round trip network delay, the changes do not reach the client 203 until a later time instant t2. However, this is not a major problem as the required video stream, namely that for viewpoint 3 can be recreated based on the received data by first decoding the frames for viewpoint 2 and then generating the frames for viewpoint 3 by a differential decoding of the differential packets for viewpoint 3. When the first intra-coded frame for viewpoint 3 is then received at t2, the client 203 can switch to proceed to decode the frames for viewpoint 3 directly and without needing a two stage decoding process.

Thus, the approach may allow for a smooth and efficient transition between different anchor video streams and anchor viewpoints. Any network latency associated with a shift can be mitigated by performing a differential decoding. Further, the viewpoints represented can be carefully selected such that efficient and smooth transitions occur without requiring video data to be transmitted for all anchor points. The approach provides a highly efficient trade off between data rate and performance. The transition between two anchor viewpoints is specifically performed such that there is consistency throughout the transition. Video streams for both viewpoints are available to the client 203 throughout the entire transition, and indeed both video streams are provided to the client 203 before, during, and after the transition. The changes are not in which of the video streams are provided to the client 203 but in how these are encoded. Typical behavior in many practical systems and uses is that users often ping-pong between different positions and thus scenarios often occur where there is a repeated change between two specific viewpoints. The described approach may be particularly advantageous in such scenarios as it continuously provides both video streams to the client 203.

In the above example, the frames for the main video stream and viewpoint are encoded without reference to frames for other viewpoints than the first viewpoint, and indeed without reference to any other frames. Rather, each frame of the main video stream is individually encoded based only on information within that frame (intra-coded).

However, in some embodiments, prediction of the frames of the main video stream may be used and indeed some of the frames of the main video stream may be differentially encoded. In some embodiments, the differential encoding may possibly be relative to frames of other video streams of the output video stream but will not be differentially encoded with respect to the frames of the differential video stream. Thus, whereas spatial prediction and differential encoding may in some embodiments be used also for the frames of the main video stream, most embodiments will not include any differential encoding of the frames of the main video stream based on any other video stream, i.e. no spatial differential encoding of frames of the main video stream are typically included.

In many embodiments, some of the frames of the main video stream may be differentially encoded relative to other frames of main video stream. In such an example, the main video stream may for example be encoded with some intra-coded frames and some differentially encoded frames which are differentially encoded with respect to an intra-coded frame. The frames of the differential video stream are still encoded differentially with respect to the frame of the main video stream for the same time instant even if this frame is itself differentially encoded. Specifically, the output generator 303 may first differentially encode a frame of the main video stream. It may then, based on the encoding, generate a decoded reference frame by decoding the generated encoding data. This frame (which directly matches that which will be generated at the client 203) is then used as a reference frame for the differential encoding of the differential video stream for the same time.

Figure 6:
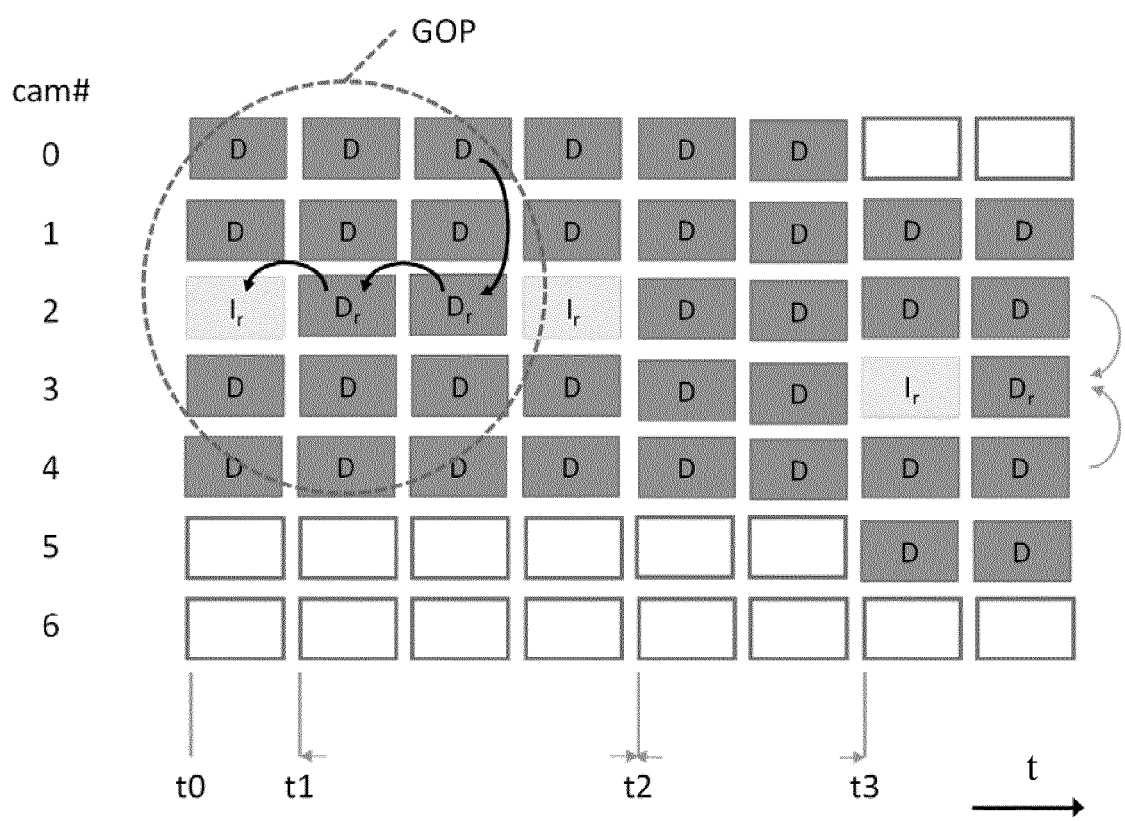
FIG. 6 illustrates an example of an encoding approach for video streams generated by a server apparatus in accordance with some embodiments of the invention.

An example of such an approach is shown in FIG. 6. In the example, some of the frames of the main video stream are accordingly also inter-coded in order to reduce the resulting bitrate.

In order to decode these frames, an earlier intra-coded frame must be available to the encoder. This introduces an additional latency since it is required that an I frame is received for the new main video stream before this is decoded. This additional latency may for example be compensated by including more neighboring views. In the example of FIG. 6, the output video stream is generated to comprise one main video stream and four differential video streams. As illustrated, a GOP is created which includes more frames and which has both a spatial and temporal extension.

In many embodiments, the apparatus may be arranged to dynamically encode the output video stream. For example, the processor 301 may receive the anchor video streams in real time and these may be fed to the output generator 303 where one anchor video stream is selected as the main video stream under the control of the controller 307. The selected main video stream may then be encoded, e.g. with all frames being intra-coded frames or with some frames being predicted based on other frames of the main video stream. In some embodiments, this encoding of the main video stream may be a transcoding if the anchor video stream is in a different encoding format, or in some embodiments the main video stream may be generated directly as the anchor video stream without any re-encoding.

The controller 307 may further select a second anchor video stream which is encoded as the differential video stream. The frames of this anchor video stream are thus dynamically and in real time differentially encoded relative to the frames of the main video stream. This differential encoding may e.g. include first decoding the anchor video stream to generate a decoded video stream which is then differentially encoded relative to the frames of the main video stream.

This approach may e.g. efficiently implement a real time broadcast server supporting a VR experience.

In other embodiments, the anchor video streams may be stored and the processor 301 may be arranged to retrieve the selected anchor video stream, and the output generator 303 may encode (transcode) the retrieved video streams in similar way as described for the real time implementation.

In some embodiments, the encoding of the different video streams is not performed dynamically during operation but may be performed in advance. Specifically, the processor 301 may store all the anchor video streams. In addition, the processor 301 may store differentially encoded versions of the anchor video streams.

For example, for each anchor video stream, the processor 301 may store a non-differentially encoded version of the anchor video stream as well as a number of differentially encoded versions where each version is differentially encoded with respect to one other anchor video stream. E.g. if the output video stream is generated to include one main video stream and two differential video streams, the processor 301 may for each anchor video stream in addition to the non-differentially encoded version store one version differentially encoded with respect to the nearest neighbor anchor video stream in one direction, and one version differentially encoded with respect to the nearest neighbor anchor video stream in the other direction (for an example where the anchor viewpoints are in a straight line).

In such examples, the output generator 303 may not generate the output video stream by selectively encoding the anchor video streams but may directly retrieve the appropriate stored versions and include them in the output video stream. Specifically, the output generator 303 may retrieve the non-differentially encoded version for the anchor video stream which is currently selected for the main video stream, and for the set of differential video streams may extract the versions of the selected anchor video streams that are differentially encoded with respect to the anchor video stream selected for the main video stream. These versions may then be included directly in the output video stream.

For example, if the main video stream is generated for viewpoint 2, the processor 301 may extract the non-differentially encoded version of the anchor video stream for viewpoint 2 and the differentially encoded versions of the anchor video streams for viewpoint 1 and 3 which are differentially encoded with respect to the anchor viewpoint for viewpoint 2.

Such an approach may provide very efficient performance in many embodiments and may especially be suitable for approaches where the server 201 is supporting multiple clients, such as e.g. for broadcasting services.

In embodiments where the anchor video streams are stored in files (whether in different versions or not), the viewpoint request received from the client 203 may directly indicate a specific file that is requested to be provided as the main video stream.

For example, instead of the client 203 continuously sending an indication of the current rendering viewpoint and the server 201 identifying the nearest anchor viewpoint, the client 203 may directly determine and request a file/anchor video stream. E.g. when the service is started, the server 201 may transmit information of the anchor viewpoints for which anchor video streams are stored at the server 201. The client 203 may then dynamically evaluate the rendering viewpoint and determine the anchor video stream that is currently desired for locally generating images corresponding to the rendering viewpoint. The client 203 may then generate a viewpoint request which directly indicates the desired file. The server 201 may in response retrieve the selected file. It may also retrieve the files of the neighboring anchor video streams that are differentially encoded relative to the requested anchor video stream and it may include these in the output video stream.

Such an approach may in many embodiments provide a very efficient approach. For example, rather than requiring a dynamic viewpoint request to be continuously transmitted and updated, the client 203 may transmit a new viewpoint/file request only when a change in the selected anchor video stream is required.

Figure 5:
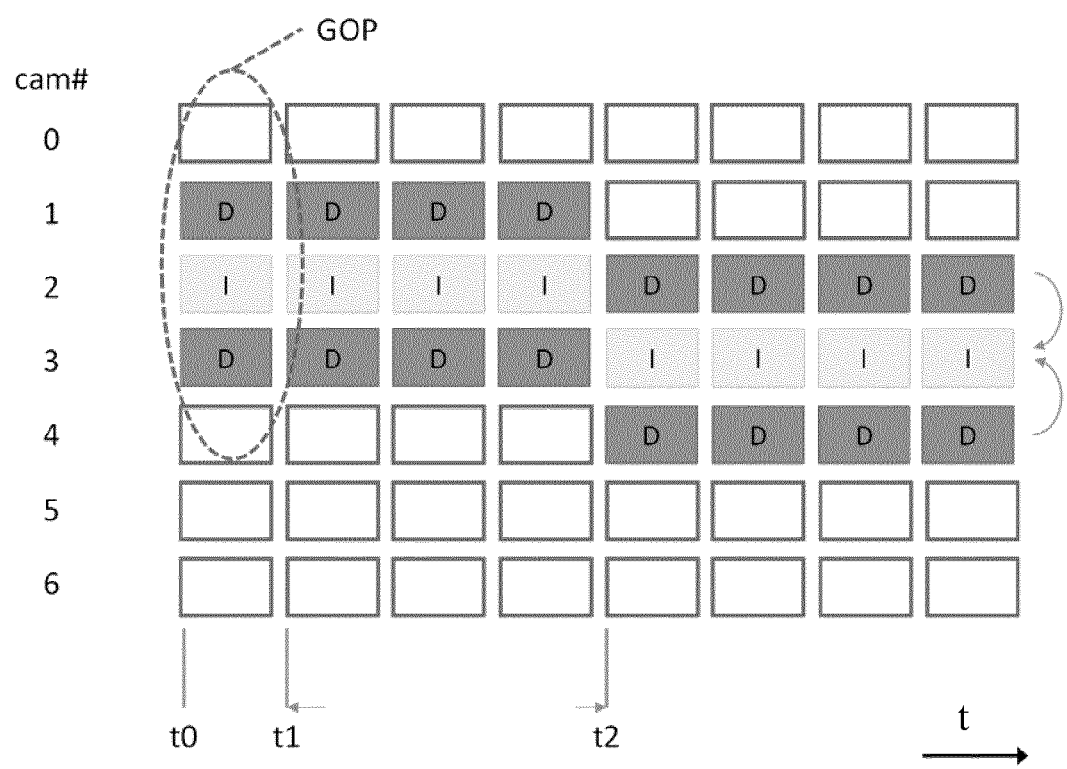
FIG. 5 illustrates an example of an encoding approach for video streams generated by a server apparatus in accordance with some embodiments of the invention.

In the previous examples, the server 201 is arranged to generate an output video stream comprising a predetermined number of differential video streams, such as specifically the two or four nearest neighbors (in the examples of FIGS. 5 and 6).

However, in some embodiments, the server 201 may be arranged to dynamically adapt the number of differential video streams. Thus, the number of anchor video streams that are selected to be included in the output video stream as differentially encoded relative to the main video stream may vary depending on the operating conditions.

In some embodiments, the number of differential video streams may be adapted in response to a latency measure for the communication channel used to transmit the output video stream, and specifically in response to the latency between the server 201 and the client 203. The latency may be determined as a communication delay and specifically as the network delay.

The network delay may e.g. be determined by data packets transmitted to the client 203 being time stamped and with the client 203 determine the delay by comparing the time stamp to the time of receipt. As another example, the client 203 may measure the time from transmitting a viewpoint request resulting in a change in the selected main anchor viewpoint until the change is detected, and this delay may be used as a latency measure. The determined latency measure may then be transmitted to the server 201 which may determine the number of differential video streams accordingly.

In many embodiments, the server 201 may be arranged to increase the number of differential video streams for an increased latency. For example, the server 201 may use a predetermined function between the latency and the number of differential video streams which increases for increasing latency (a monotonically increasing function).

Such an approach may allow a flexible adaptation of the data rate to the current conditions. For larger latencies the probability of the rendering viewpoint changing to require an anchor video stream further from the current main anchor viewpoint increases and indeed for faster changes the change in the provided anchor video stream may not be sufficiently fast. For example, if the rendering viewpoint may change by a distance of, e.g. two anchor viewpoints in the round trip delay time, it is required that not only the first but also the next closest neighbor anchor video stream is included in the output video stream.

In some embodiments, the server 201 may be arranged determine the number of additional video streams in response to a variation measure for the viewpoint request.

For example, for a viewpoint request which has many and large variations, it may be desirable to include a higher number of differential video streams than when there are fewer variations in order to increase the likelihood that the anchor video stream required at the client 203 at any given time is indeed provided to this.

The server 201 may specifically be arranged to adapt the number of differential video streams in response to the speed of the variation/change in the viewpoint request. Specifically, if the viewpoint request indicates a fast-changing viewpoint, the server 201 may increase the number of differential video streams that are included relative to when the viewpoint request indicates a slow variation.

The approach may thus allow a variable adaptation of the data rate to the current conditions.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

In accordance with some embodiments of the invention, there may be provided:

1. An apparatus for generating an output video stream, the apparatus comprising:

a processor (301) for providing a plurality of reference video streams for a plurality of reference viewpoints for a scene;

a receiver (305) for receiving a viewpoint request from a remote client, the viewpoint request being indicative of a requested viewpoint of the scene for the output video stream;

a generator (303) for generating an output video stream comprising a first video stream comprising first output frames from a first reference video stream of the plurality of reference video streams for a first viewpoint and a second video stream comprising second output frames from a second reference video stream of the plurality of reference video streams for a second reference viewpoint, the second output frames being differentially encoded relative to the first output frames and the first output frames not being differentially encoded relative to the second output frames; and a controller (307) for determining the first viewpoint and the second viewpoint as viewpoints of the plurality of reference viewpoints in response to the viewpoint request; wherein the controller (307) is arranged to, in response to a detection during the generation of the output video stream of a change in the viewpoint request meeting a criterion, change the first viewpoint from being a first reference viewpoint of the plurality of reference viewpoints and the second viewpoint from being a second reference viewpoint of the plurality of reference viewpoints to the first viewpoint being the second reference viewpoint and the second viewpoint being the first reference viewpoint.

In some, but not all, embodiments, the first output frames are encoded without reference to frames for other reference viewpoints than the first viewpoint.

In some, but not all, embodiments, the first output frames are intracoded.

In some, but not all, embodiments, some of the first output frames are differentially encoded relative to other frames of the first output frames.

In some, but not all, embodiments, the output generator (303) is arranged to generate the second output frames by differentially encoding frames from the second reference video stream relative to the first output frames.

In some, but not all, embodiments, the processor (301) is arranged to store differentially encoded versions of at least some of the plurality of reference video streams, a differentially encoded version of a reference video stream comprising frames differentially encoded with respect to frames of another reference video stream; and the generator (303) is arranged to generate the second video stream in response to retrieving a differentially encoded version of the second reference video stream being a version of the second video stream comprising frames differentially encoded relative to frames of the first reference video stream.

In some, but not all, embodiments, the processor (301) is arranged to store the plurality of reference video streams as files and the controller (307) is arranged to select the first reference video stream and the second reference video stream in response to a file retrieval request of the viewpoint request, the file retrieval request being indicative of a stored file comprising a reference video stream.

In some, but not all, embodiments, the apparatus is further arranged to include a number of additional video streams in the output video stream, each additional video stream comprising output frames from an additional reference video stream of the plurality of reference video streams differentially encoded relative to the first output frames; and wherein the controller (307) is arranged to determine the number of additional video streams in response to a latency measure for a communication channel for transmitting the output video stream.

In some, but not all, embodiments, the apparatus is further arranged to include a number of additional video streams in the output video stream, each additional video stream comprising output frames from an additional reference video stream of the plurality of reference video streams differentially encoded relative to the first output frames; and wherein the controller (307) is arranged to determine the number of additional video streams in response to a variation measure for the viewpoint request.

An apparatus for rendering a video stream, the apparatus comprising:

a receiver (401) for receiving the video stream, the video stream comprising a first video stream comprising first frames representing frames for a first viewpoint of a scene and a second video stream comprising second frames for the scene from a second viewpoint, the second frames being differentially encoded relative to the first frames and the first frames not being differentially encoded relative to the second frames;

a renderer (403) for rendering output view images for a viewpoint in response to the first video frames and the second video frames;

a detector (409) for detecting a change in the video stream from the first viewpoint corresponding to a first reference viewpoint and the second viewpoint corresponding to a second reference viewpoint to the first viewpoint corresponding to the second reference viewpoint and the second viewpoint corresponding to the first reference viewpoint; and an adapter (411) for adapting the rendering in response to the detection.

In some, but not all, embodiments, the renderer (403) is arranged to synthesize the view images using viewpoint shifting applied to at least one of the first frames and the second frames.

In some, but not all, embodiments, the adapter is arranged to adapt the viewpoint shifting to compensate for a change in viewpoint for at least one of the first frames and the second frames.

A method of generating an output video stream, the method comprising:

providing a plurality of reference video streams for a plurality of reference viewpoints for a scene;

receiving a viewpoint request from a remote client, the viewpoint request being indicative of a requested viewpoint of the scene for the output video stream;

generating an output video stream comprising a first video stream comprising first output frames from a first reference video stream of the plurality of reference video streams for a first viewpoint and a second video stream comprising second output frames from a second reference video stream of the plurality of reference video streams for a second reference viewpoint, the second output frames being differentially encoded relative to the first output frames and the first output frames not being differentially encoded relative to the second output frames;

determining the first viewpoint and the second viewpoint as viewpoints of the plurality of reference viewpoints in response to the viewpoint request; and wherein determining the first viewpoint and the second viewpoint comprises changing, in response to a detection during the generation of the output video stream of a change in the viewpoint request meeting a criterion, the first viewpoint from being a first reference viewpoint of the plurality of reference viewpoints and the second viewpoint from being a second reference viewpoint of the plurality of reference viewpoints to the first viewpoint being the second reference viewpoint and the second viewpoint being the first reference viewpoint.

A method of rendering a video stream, the method comprising:

receiving the video stream, the video stream comprising a first video stream comprising first frames representing frames for a first viewpoint of a scene and a second video stream comprising second frames for the scene from a second viewpoint, the second frames being differentially encoded relative to the first frames and the first frames not being differentially encoded relative to the second frames;

rendering output view images for a viewpoint in response to the first video frames and the second video frames;

detecting a change in the video stream from the first viewpoint corresponding to a first reference viewpoint and the second viewpoint corresponding to a second reference viewpoint to the first viewpoint corresponding to the second reference viewpoint and the second viewpoint corresponding to the first reference viewpoint; and adapting the rendering in response to the detection.

The invention claimed is:

1. An apparatus for generating an output video stream, the apparatus comprising:
   a processor circuit,
      wherein the processor circuit is arrange to provide a plurality of reference video streams,
      wherein the plurality of reference view streams comprise a first reference video stream, a second reference video stream and a third reference video stream,
      wherein the plurality of reference video streams have a plurality of reference viewpoints for a scene,
      wherein the plurality of reference viewpoints comprise a first reference viewpoint and a second reference viewpoint;
   a receiver circuit,
      wherein the receiver circuit is arrange to receive a viewpoint request from a remote client,
      wherein the viewpoint request is indicative of a requested viewpoint of the scene for the output video stream;
   a generator circuit,
      wherein the generator circuit is arrange to generate an output video stream,
      wherein the output video stream comprises a first video stream and a second video stream,
      wherein the first video stream comprises first output frames,
      wherein the first output frames are a portion of the first reference video stream,
      wherein the first reference stream has a first viewpoint,
      wherein the second video stream comprises second output frames,
      wherein the second output frames are a portion of the second reference video stream,
      wherein the second reference stream has a second reference viewpoint,
      wherein the second output frames are differentially encoded relative to the first output frames,
      wherein the first output frames are not differentially encoded relative to the second output frames; and
   a controller circuit, wherein the controller circuit is arranged to determine the first viewpoint and the second viewpoint in response to the viewpoint request;
   wherein the controller circuit is arranged to, change the first viewpoint from the first reference viewpoint to the second reference viewpoint in response to a detection during the generation of the output video stream of a change in the viewpoint request,
   wherein the controller circuit is arranged to change the second viewpoint from the second reference viewpoint to the first viewpoint in response to a detection during the generation of the output video stream of a change in the viewpoint request,
   wherein the change in the viewpoint request meets a criterion,
   wherein the output video stream comprises a plurality of additional video streams,
   wherein each of the additional video streams comprise third output frames, wherein the third output frames are at least a portion of the third reference video stream, wherein the third output frames are differentially encoded relative to the first output frames wherein the controller circuit is arranged to determine the number of additional video streams in response to at least one of a variation measure for the viewpoint requests and a latency measure for a communication channel, wherein the communication channel is arranged to transmit the output video stream.

2. The apparatus of claim 1, wherein the first output frames are encoded without reference to frames with excluded reference viewpoints, wherein the excluded reference viewpoints are different than the first viewpoint.

3. The apparatus of claim 2, wherein the first output frames are intracoded.

4. The apparatus of claim 2, wherein the first output frames comprise a first portion and second portion, wherein the first portion is differentially encoded relative to the second portion.

5. The apparatus of claim 1 wherein the output generator circuit is arranged to generate the second output frames by differentially encoding frames from the second reference video stream relative to the first output frames.

6. The apparatus of claim 1, wherein the processor circuit is arranged to store differentially encoded versions of at least a portion of the plurality of reference video streams, wherein the processor circuit is arrange to store a differentially encoded version of at least one of the plurality of reference video streams, wherein the stored differentially encoded version of the reference stream comprises frames differentially encoded with respect to frames of another reference video stream wherein the generator circuit is arranged to generate the second video stream in response to retrieving a differentially encoded version of the second reference video stream, wherein the second reference view stream is a version of the second video stream comprising frames differentially encoded relative to frames of the first reference video stream.

7. The apparatus of claim 1, wherein the processor circuit is arranged to store the plurality of reference video streams as files, wherein the controller circuit is arranged to select the first reference video stream and the second reference video stream in response to a file retrieval request of the viewpoint request, wherein the file retrieval request is indicative of a stored file comprising at east of the plurality of reference video streams.

8. The apparatus of claim 1, wherein the controller circuit is arranged to change the first viewpoint in response to at least one distance between the requested viewpoint and the plurality of reference viewpoints.

9. The apparatus of claim 1, wherein the controller circuit is arranged to change the first viewpoint in response to a rate of change for the requested viewpoint.

10. The apparatus of claim 1, wherein the controller circuit is arranged to change the first viewpoint in response to a latency measure.

11. A method of generating an output video stream, the method comprising:

providing a plurality of reference video streams for a plurality of reference viewpoints for a scene, wherein the plurality of reference view streams comprise a first reference video stream, a second reference video stream and a third reference video stream;

receiving a viewpoint request from a remote client, wherein the viewpoint request is indicative of a requested viewpoint of the scene for the output video stream;

generating an output video stream, wherein the output video stream a first video stream and second video stream, wherein the first video stream comprises first output frames from the first reference video stream, wherein the first reference stream has a first viewpoint, wherein the second video stream comprises second output frames from the second reference video stream, wherein the second reference stream has a second reference viewpoint, wherein the second output frames are differentially encoded relative to the first output frames, wherein the first output frames are not differentially encoded relative to the second output frames;

determining the first viewpoint and the second viewpoint as viewpoints of the plurality of reference viewpoints in response to the viewpoint request, wherein the plurality of reference viewpoints comprise a first reference viewpoint and a second reference viewpoint; and wherein determining the first viewpoint and the second viewpoint comprises changing, the first viewpoint from the first reference viewpoint to the second reference viewpoint and the second viewpoint from the second reference viewpoint in response to a detection during the generation of the output video stream of a change in the viewpoint request;

wherein the output video stream comprises a plurality of additional video streams, wherein each additional video stream comprise third output frames, wherein the third output frames are at least a portion of the third reference video stream, wherein the third output frames are differentially encoded relative to the first output frames; and determining the number of additional video streams in response to at least one of a variation measure for the viewpoint requests, and a latency measure for a communication channel, wherein the communication channel is arranged to transmit the output video stream.

12. A computer program stored on a non-transitory medium, wherein the computer program when executed on a processor performs the method as claimed in claim 11.

13. The method of claim 11, wherein the first output frames are encoded without reference to frames with excluded reference viewpoints, wherein the excluded reference viewpoints are different than the first viewpoint.

14. The method of claim 13, wherein the first output frames are intracoded.

15. The method of claim 13, wherein the first output frames comprise a first portion and second portion, wherein the first portion is differentially encoded relative to the second portion.

16. The method of claim 11, further comprising generating the second output frames by differentially encoding frames from the second reference video stream relative to the first output frames.

17. The method of claim 11, further comprising:
storing differentially encoded versions of at least a portion of the plurality of reference video streams;
storing a differentially encoded version of at least one of the plurality of reference video streams, wherein the stored differentially encoded version of the reference stream comprises frames differentially encoded with respect to frames of another reference video stream; and
generating generate the second video stream in response to retrieving a differentially encoded version of the second reference video stream, wherein the second reference view stream is a version of the second video stream comprising frames differentially encoded relative to frames of the first reference video stream.

18. The method of claim 11, further comprising:
storing the plurality of reference video streams as files; and
selecting the first reference video stream and the second reference video stream in response to a file retrieval request of the viewpoint request,
wherein the file retrieval request is indicative of a stored file comprising at east of the plurality of reference video streams.

19. The method of claim 11, further comprising changing the first viewpoint in response to at least one distance between the requested viewpoint and the plurality of reference viewpoints.

20. The method of claim 11, further comprising changing the first viewpoint in response to a rate of change for the requested viewpoint.

* * * * *